(12) United States Patent
Voltani et al.

(10) Patent No.: US 12,423,604 B1
(45) Date of Patent: Sep. 23, 2025

(54) ARTIFICIAL SENSOR SAMPLE GENERATION

(71) Applicant: Tractian Technologies Inc, Atlanta, GA (US)

(72) Inventors: João Pedro de Carvalho Voltani, São Paulo (BR); Igor Vinicius Alvarenga Marinelli, Atlanta, GA (US)

(73) Assignee: Traction Technologies Inc, Atlanta, GA (US)

( * ) Notice: Subject to any disclaimer, the term of this patent is extended or adjusted under 35 U.S.C. 154(b) by 0 days.

(21) Appl. No.: 19/065,858

(22) Filed: Feb. 27, 2025

(51) Int. Cl.
*G06N 7/00* (2023.01)
*G06N 20/00* (2019.01)

(52) U.S. Cl.
CPC .............. *G06N 7/00* (2013.01); *G06N 20/00* (2019.01)

(58) Field of Classification Search
CPC ................................. G06N 7/00; G06N 20/00
See application file for complete search history.

(56) References Cited

U.S. PATENT DOCUMENTS

| 11,797,705 | B1* | 10/2023 | Voinea ................. G06F 21/6245 |
| 2020/0284942 | A1* | 9/2020 | Chen ........................ G01V 8/00 |
| 2021/0110089 | A1* | 4/2021 | Chen ...................... G06V 20/64 |
| 2021/0319308 | A1* | 10/2021 | Sankaranarayanan ... G06N 3/04 |
| 2022/0391766 | A1* | 12/2022 | Acuna Marrero ..... G06N 20/00 |
| 2024/0119199 | A1* | 4/2024 | Balasubramanian ........ G06N 3/0475 |
| 2024/0330743 | A1* | 10/2024 | Andre .................... G06N 3/088 |

\* cited by examiner

*Primary Examiner* — Manuel A Rivera Vargas
(74) *Attorney, Agent, or Firm* — Cognition IP, P.C.; Edward Steakley; Saleh Kaihani

(57) ABSTRACT

A maintenance and monitoring infrastructure can collect real machine samples and train failure analysis models to identify operational anomalies, indicative of a machine failure. Failure analysis models can be trained and more robustly tested and developed by using artificial samples that can simulate what a real monitor would have measured had the real monitor been deployed in a set of selected circumstances (a scenario). A synthetic sample generator (SSG) can include a seed development cycle stage (SDCS) and a synthesis execution stage (SES). The SDCS can generate a signal, from which the SES can generate a multi-phenomena synthetic signal, simulating a scenario, where a monitor would have likely yielded the generated synthetic signal, or a similar signal. The synthetic signal data can be used to train failure analysis models.

20 Claims, 8 Drawing Sheets

ARTIFICIAL SENSOR SAMPLE GENERATION

BACKGROUND

Field

This invention relates generally to the field of signal processing and more particularly to artificial signal generation from real signals.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Industrial plants can include numerous mechanical machines with thousands of moving parts. To increase the efficiency of plant operations, the machines are monitored for maintenance purposes. Monitoring can include a trained technician visually inspecting the machines, observing the machine operations, and listening for any abnormal auditory cues that can indicate a present or potential maintenance-related fault in the machines. The technicians can also perform more sophisticated diagnosis, using maintenance and diagnostic tools. Continuous monitoring of industrial machines can present operational inefficiencies and cost to an industrial plant, particularly as the number of machines can be substantial in an industrial plant. For these and similar reasons, plants or busy shops with mechanical machines can benefit from an automated maintenance infrastructure. The automatic maintenance infrastructure can continuously collect maintenance-related data from various machines, detect maintenance-related events, and recommend appropriate action.

An automatic maintenance infrastructure can take advantage of monitors and receivers that are equipped with wireless communication technology. Since the monitors in some or many cases can be battery-powered, there is a need for a robust communication technology, which can reliably transmit data payloads between the monitors and receivers, while preserving the battery life of the monitors.

In many cases, an automatic maintenance and monitoring infrastructure can require sample data for various purposes, including for development of failure analysis models. For some industrial machines, sample monitoring data can be hard to acquire and/or may require a substantial period of monitoring before a minimum usable collection of monitored data can be collected. In these and other circumstances, artificial generation of samples and monitored samples can be useful.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

DETAILED DESCRIPTION

Figure 1A:
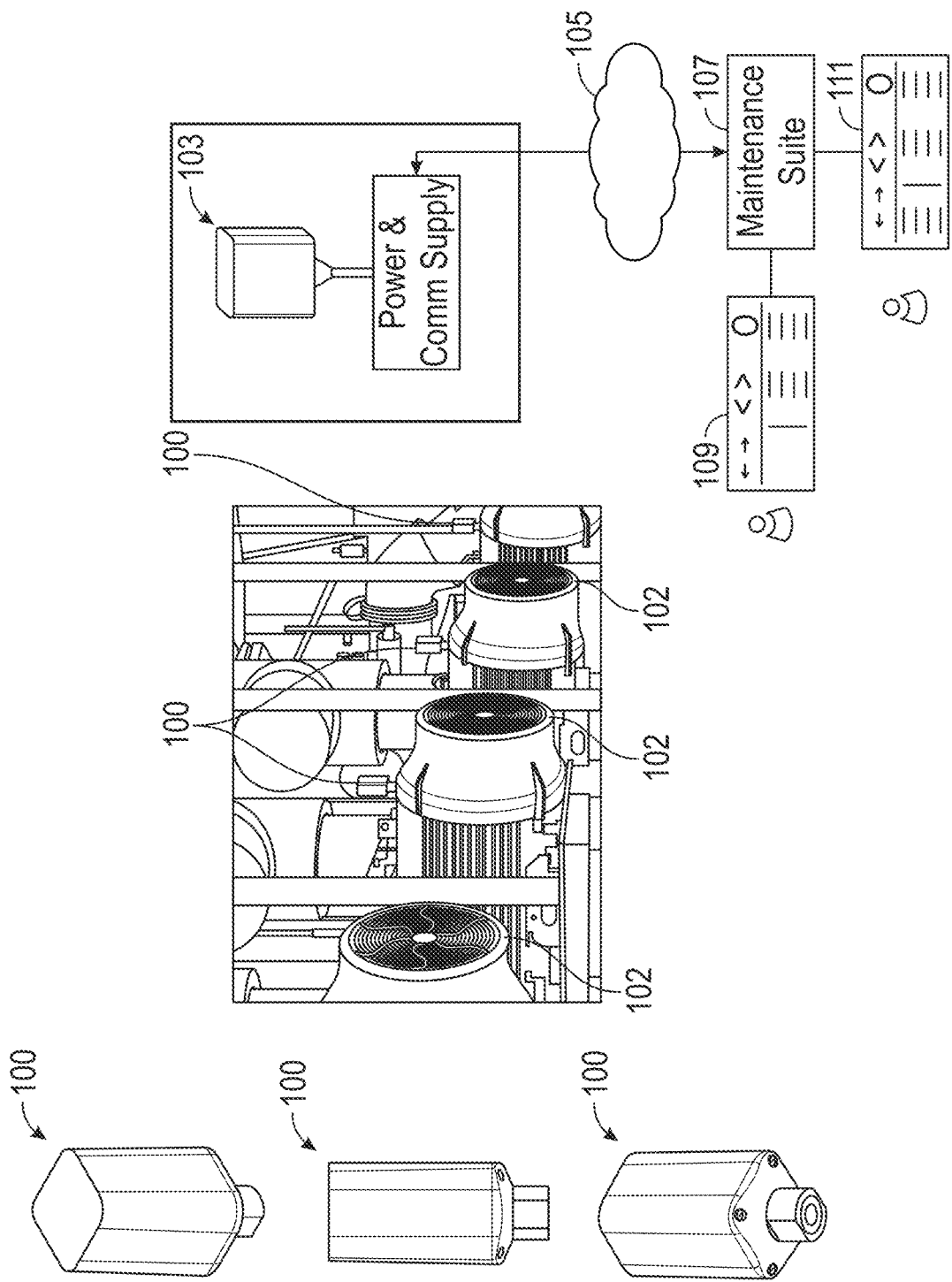
FIG. 1A illustrates example diagrams of a monitor, industrial machines, and an infrastructure of fault monitoring and maintenance operations according to some embodiments.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Industrial machines can benefit from consistent and accurate fault monitoring with artificial intelligence processing of the monitored data. In some embodiments, a plurality of small monitor assemblies, each equipped with wireless communication circuitry can be attached to various industrial machines in a plant. The monitors can sense and report various operational parameters related to fault monitoring. For example, temperature and vibration can be monitored and reported. The quality of vibrations, vibration trend data and other characteristics can be indicators of fault occurring or developing in an industrial machine. Similarly, temperature and temperature trends of a machine can include indicators of occurring or upcoming faults in the machine.

In summary, the described embodiments of synthetic sample generator can enable acceleration in development (for example, by allowing for rapidly generating large datasets without depending on labor-intensive real data collection). The synthetic sample generator can allow for benchmarking operations (for example, by allowing for evaluation of models under rare or difficult-to-replicate phenomena). The synthetic sample generator can allow for data augmentation (for example, mitigating data scarcity for intermittent asset or machine monitoring—for example, for CNC machines, rare machine failures, etc.). The synthetic sample generator can provide mock data for other services, such as data that can support services, such as demo platforms needing realistic but non-sensitive sensor data.

FIG. 1A illustrates example diagrams of a monitor 100, industrial machines 102, and an infrastructure of fault monitoring and maintenance operations according to some embodiments. The monitor 100 can be battery operated and can include a variety of sensing components enclosed in a housing. The monitor 100 can attach to machines 102 in the plant using a magnetic connection and/or by using other methods of attachment and fastening to secure the monitors 100 to machines 102 in the plant. The attachment of the monitors 100 to machines 102 can depend on the magnitude of the vibrations and other considerations related to the environment of the machines 102 and the plant. For example, if larger magnitude vibrations are expected, the connection between the monitors 100 and the machines 102 can be secured with an adhesive agent, so the monitors 100 can maintain their connections to the machines 102, despite large vibrations.

The monitors 100 can include wireless communication circuitry and can be in wireless communication with one or more receivers 103. In some embodiments, one or more monitors 100 can be modified to be in wired communication with a receiver 103 and have a connection to an outlet source of power. In other words, the source of power and type of communication of the monitors 100 can be modified, depending on the application and the environment of the plant to include any combination of battery-operated, outlet-operated, wired communication, and wireless communication. Similarly, the receivers 103 can include both wired and wireless communication circuitry. The receivers 103 can also be powered with or without the use of a battery. In some embodiments, both the monitors 100 and the receivers 103 can wirelessly communicate to a portable computer, such as a laptop, a smart phone, a smart tablet, or other portable devices, in the field, using a local or cellular wireless network. Although the term receiver is used, the receivers can also send data to monitors 100. Consequently, receivers 103 can be transceiver devices. For example, a receiver 103 can send a configuration file to a monitor 100 to enable, disable or otherwise configure various operating parameters of the monitor 100.

Both monitors 100 and receivers 103 can include processing and communication circuitry. For example, both monitors 100 and receivers 103 can include microprocessors, permanent and impermanent memory devices, and transceivers or equivalent devices. Monitors 100 and receivers 103 can perform various data processing when transmitting and/or receiving sensor data, and/or instructions and specifications data, related to their respective operations.

The numbers and locations of the receivers 103 can depend on the size of the plant and then numbers and distances of the monitors 100, relative to the receiver 103 and the wireless communication technology used to communicate between the monitors 100 and the receiver 103. The receivers 103 can be mounted at various locations in a plant and can have connection to a power and a communication source. For example, the receivers 103 in a plant can be in wired and/or wireless communication to one or more communication portals 105. Example communication portals 105 can include a local network, the Internet, one or more cloud infrastructures, gateways, other receivers 105, and other communication midpoints, or endpoints. The receivers 103 can transmit the fault monitoring data for upstream processing. The receivers 103 can also receive various operational configuration files, settings files, and/or other operating parameters and can transmit the operating parameters to the monitors 100. Examples operating parameters can include various timing and frequency of when and how the monitors 100 should collect data from the machines 102.

A maintenance suit 107 can receive monitoring data from the monitors 100 and perform processing related to fault monitoring and maintenance operations on the data. The maintenance suite 107 can include a variety of submodules and databases that can support processing of the monitoring data, including, storage of the data, generating reports from the data, extracting trends from the data, generating fault prediction from the data, generating maintenance action items, tickets, generating alerts, and/or other automated actions related to the maintenance of the machines 102. In some embodiments, the operations of the maintenance suite 107 can include artificial-intelligence submodules that can assist in fault prediction, maintenance recommendation pattern and trend detection, and other data analytics action, augmented or generated by artificial intelligence models. Example artificial intelligence techniques and/or models used by maintenance suite 107 can include neural networks, deep neural networks, machine learning, convolutional neural networks (CNNs), random forests, and others.

The maintenance suite 107 can support a variety of user interfaces (UIs). For example, the maintenance suite 107 can support a frontend user interface 109 and a backend user interface 111. Various parameters related to the operation of the monitors 100 can be viewed and/or modified via the user interfaces 109, 111. The user interfaces 109, 111 can provide access for a user to generate or modify configuration files, settings and operating parameters for the monitors 100 and the maintenance suite 107. The users can also view the output of the maintenance suite 107 via the user interfaces 109, 111.

While not shown, the monitors 100 are not the only maintenance-related in-field components operated by the maintenance suite 107. Other components associated with monitoring and maintenance of the machines 102 and the plant can also be in communication with the maintenance suite 107. For example, in some embodiments, energy management components in communication with the maintenance suite 107, can monitor the power consumption of the machines 102 and their plant.

Depending on the size of an industrial plant, the monitors 100 can be numerous, for example in the hundreds or thousands. The maintenance suite 107 can streamline and track data from hundreds or thousands of machines and automate the identification and tracking of maintenance-related tasks for a large industrial plant, having hundreds or thousands of machines.

Figure 1B:
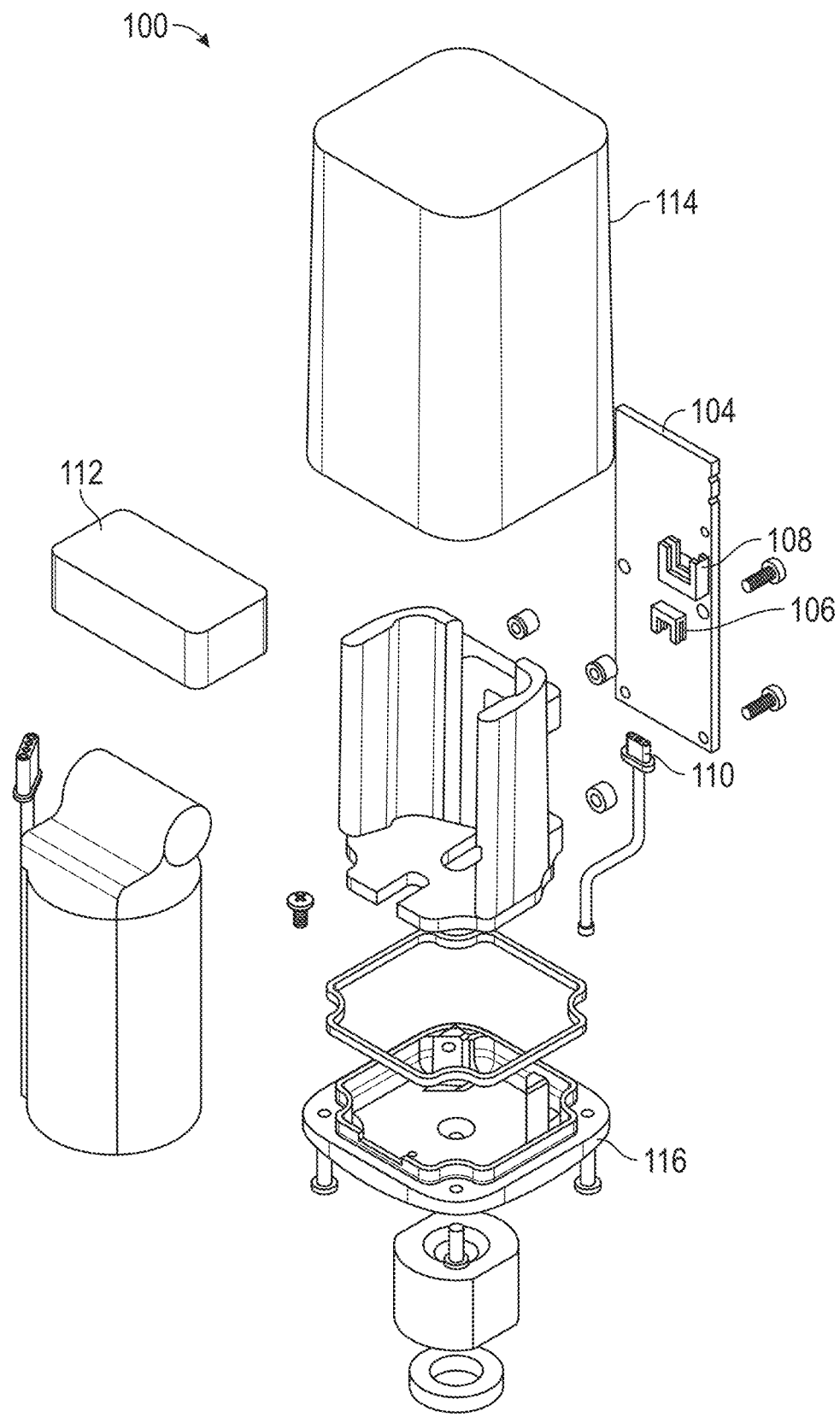
FIG. 1B illustrates an exploded view of the monitor of the embodiment of FIG. 1A.

FIG. 1B illustrates an exploded view of a monitor 100. Some example components include the printed circuit board (PCB) 104, the microcontroller 106, an accelerometer 108, a temperature sensor 110, a battery module 112, various spacers, holders, internal conduits, and a housing 114. The housing 114 can house the internal components of the monitor 100. A housing lid 116 can enclose the housing 114 and seal the internal components of the monitor 100 from the outside. The monitor 100 can be made water-, dust- and particle-resistant by a variety of techniques. For example, in some implementations, the monitor 100 can be resin-coated. The battery module 112 can include one or more lithium-ion batteries, and a battery management system (BMS). In other embodiments, the BMS can be external to the battery module 112, for example, it can be mounted on the PCB 104. In some embodiments, the life expectancy of the battery module 112 can be between three to five years. In some embodiments, the monitor 100 can be manufactured using application-specific integrated circuit (ASIC) technology, in lieu of or in addition to using a PCB technology.

The monitor 100 can include communication circuitry, corresponding to the communication circuitry of one or more receivers, for example, the receivers 103, and one or more local, private and/or public communication network, including one or more cellular networks. The choice of network and communication circuitry can depend on the size of the plant and the distance of the monitor 100 from a receiver 103. The communication circuitry of the monitor 100 can be mounted on the PCB 104. In some embodiments, the communication circuitry may be integrated in the microcontroller 106. Similarly, in other embodiments, various components can be combined into one or use a component that integrates several components together. On the other hand, some components, for example, the communication circuitry of the monitor 100, can be a separate module, embedded on the PCB 104, or otherwise separately included in the monitor 100. In some embodiments, the communication circuitry of the monitor 100 can include a transceiver, as an independent component, or as an internal component of another component, such as the microcontroller 106. The microcontroller 106 can alternatively be referred to as a microprocessor. The monitor 100 can include a magnetic collar to provide magnetic attachment between the monitor 100 and the machine 102. In some embodiments, the temperature sensor 110 can be routed to a surface very near the point of contact between the monitor 100 and the machine 102 to provide a more accurate reading of the temperature of the machine 102.

The accelerometer 108 can be a micro-electro-mechanical system (MEMS) accelerometer, capable of one, two, or three axis acceleration data. For example, in some embodiments, the accelerometer 108 can measure forces in three directions along the XYZ axes. The accelerometer 108 can measure and transmit both magnitude and spectral data of the vibrations of a machine 102 to the microcontroller 106.

The microcontroller 106 can be a collection of various components, including computer or computing components. Example components of the microcontroller 106 can include a processor, or a microprocessor, such as a central processing unit (CPU), permanent and impermanent memory, including for example, random access memory (RAM) of various kinds, solid state, flash or other permanent memory, interconnects, buses and communication vias between the various components. In some embodiments, the microcontroller 106 can include external communication circuitry to enable wireless communication, including radio frequency identification (RFID), Bluetooth, cellular, or other communication technologies. In other embodiments the monitor 100 can include dedicated wireless communication circuitry, fabricated or included in the monitor 100, in a separate component than the microcontroller 106.

The monitors 100 can be configured to spend the majority of their time in hibernation state to conserve battery power. In hibernation mode, the power to all or some of the components of the monitor 100 can be reduced or minimized, thereby reducing the overall battery consumption in the hibernation state. The monitors 100 can be configured to periodically exit hibernation mode and enter normal operation mode, where power and functionality to some or all components is restored. For example, the monitors 100 can perform periodic sampling of various operational parameters of the machines 102, such as temperature and vibrations. When scheduled sampling is not performed, the monitors 100 can be in hibernation mode.

The monitors 100 can perform a variety of samplings of machine operation parameters. For example, for the vibration parameter of the machines 102, the monitors 100 can perform various samplings at different intervals and with different characteristics. Example sampling characteristics can include sampling intervals, sampling frequency, sampling rate, sampling range, sampling resolution and other characteristics. Sampling interval can refer to the period by which the monitor 100 turns ON and performs a sampling with a selected set of sampling characteristics. In some embodiments, the monitors 100 can be configured to perform scheduled sampling sessions, which are samplings performed at selected intervals. The selected intervals can depend on the type of machines 102 and other factors that are application-dependent, based on where the monitors 100 are used. Example sampling intervals can include sampling with intervals separated by minutes, hour or hours, days, or even months, and other intervals.

The samples collected by the monitor 100 can be used in a variety of downstream operations and applications. For example, the sample data can be used to build, train or finetune monitoring and maintenance (MM) models. However, in a variety of applications, the quantity of real sample data may be less than adequate. In these circumstances, generating and synthesizing sample data from existing data can improve various downstream operations. Consequently, synthesis of monitor sample data can be useful. First, synthesis can speed up data science and analysis by simplifying access to data that can incorporate in models and analysis. For example, synthesizing 10k samples can take much shorter time than fetching and downloading organic samples. When drafting a new data science model, having readily accessible data to use or discard can be useful. Second, synthesis enables developing benchmark performance models, especially for odd, experimental, inaccessible, or controlled cases. Some failures, or phenomena can be too infrequent, rare, or difficult to validate mechanically before they can be modeled. In these scenarios, the rarity or difficulty of obtaining organic examples can make it difficult to train, evaluate or otherwise build robust models. The described embodiments can address these issues by generating synthetic samples from limited organically obtained samples. Third, synthetic generation of sample data can help mitigate the issue of data shortage in development, evaluation and training. Some industrial machines, such as computer numerical control (CNC) machines, run randomly or intermittently, making collection of organic samples in large quantities and developing models to address their failures difficult or impractical to develop and build. Synthetic sample data can also reduce development cost by cutting the time and resources needed to obtain organic samples. Synthetic samples can also help showcase or demo maintenance and monitoring tools.

Synthetic samples can be indistinguishable from organically obtained samples as measured by a monitor 100. Organic samples are the result of complex interaction of several independent phenomenon sources. In the same manner, the synthetic samples are generated by combining the contributions of those same independent sources. For example, healthy unloaded rotation of a motor has a corresponding signature in an organic sample, obtained from the motor. Similarly, a motor with a bearing-wear failure generates a corresponding signature in the organic samples obtained from that motor. The described embodiments generate the same signatures in the synthetic samples, as if the synthetic sample was organically obtained by real-world measurements of a monitor 100 measuring a motor with those characteristics.

The monitor sample data is influenced by various phenomena, including for example, mechanical phenomena, electrical phenomena, thermodynamics phenomena and others. contributions generate distinct signatures that travel toward the sensor, interacting with various elements along the way. Regardless of their specific nature—be it mechanical, electrical, thermal, or otherwise—this information traverses a medium as perturbations in certain qualities, which can be conceptualized as multi-dimensional (e.g., three-dimensional waves). The sensor has the ability to measure the perturbations as a function of time, that can be referred to as a wave signal. In some respect, the sensor collects sequences of measurements that can be modeled or can be related to each other and the perturbations. In other words, the wave signal, s(t) can be a discrete approximation to the continuous perturbations, as expressed in Equation (1).

$$s(t) \approx s_{t0}, \ldots, s_{tn} \qquad \text{Equation (1)}$$

The time domain wave signal can be transformed to frequency domain to reduce the complexity of the mathematical operations, related to modeling or processing of the wave signal. For example, a Fourier Transform, such as discrete Fourier transform (DFT) can be used to transform the wave signal to frequency domain, as shown in Equation (2).

$$s(k) = \sum_{t=0}^{N-1} s_t \cdot e^{-i\frac{2\pi k}{N}t} = s_{k0}, \ldots, s_{kN} \qquad \text{Equation (2)}$$

By identifying the frequency as a function of the k-modus $$f(k) = \frac{2\pi k}{N},$$

Equation (2) is an expression for the spectrum or frequency domain signal. In Equation (1) $s_t$ is Real, as it corresponds to the sensor-measured value, while $s_k$ (or the Fourier component k) is Complex.

Equation (2), which is a DFT expression of the spectrum signal, as a transformation of the wave signal, can have a counterpart anti-transform, which can allow for an alternative expression of the wave signal in terms of the spectrum signal, as shown in Equation (3).

$$s(t) = \frac{1}{N}\sum_{k=0}^{N-1} s_k \cdot e^{i\frac{2\pi k}{N}t} \qquad \text{Equation (3)}$$

Equation (3) is true for a single wave and can be unsuitable for generating synthesized samples. Extending the Equation (3), for example, by treating the Fourier components, as random variables, can allow for simulating synthesized samples. One example of extending the Equation (3) can be illustrated by Equation (4).

$$s_k \rightarrow \hat{s}_k \sim S(x; \vec{\theta})_k \qquad \text{Equation (4)}$$

The Fourier components can be an occurring event, from a distribution $S(x; \vec{\theta})_k$ that can depend on the frequency (or mode) k. and a characteristics parameter $\hat{\theta}$.

By way of example, if the wave signal is a sine wave with k=9, the Fourier components can be replaced with a distribution (e.g., a normal distribution) with mean μ=k and variance $\sigma^2=1/k$, that is N(x; μ=k, σ=√(1/K)) then k=9 is the expected value to draw to span the signal of this example. It can be stated that 68% of the draws falls between 8.66 and 9.33. A source seed for obtaining synthetic samples can be obtained by combining Equations (3) and (4), yielding Equation (5).

$$s(t) = \frac{1}{N}\sum_{k=0}^{N-1} \hat{s}_k \cdot e^{i\frac{2\pi k}{N}t}, \text{ where } \hat{s}_k \sim S(x; \vec{\theta})_k \qquad \text{Equation (5)}$$

If for each mode k=9, a distribution can be estimated or selected, similar to what was described in relation to the example above, a Fourier component can be sampled from each distribution. The sampled Fourier components can be used to generate a synthetic wave-signal, using Equation (4). In other words, synthesizing samples can be equivalent to finding or estimating $S(x; \vec{\theta})_k$, for example, for each mode k, a distribution with parameters, ($\vec{\theta} \rightarrow \vec{\theta}$ (i.e., $S_k(x; \vec{\theta}) \rightarrow S_k(x; \vec{\theta})$, is found.

In some embodiments, a data driven method of estimating a distribution using a histogram can be used. The method can provide for both shape and fitted parameters of the estimated distribution, $S_k(x; \vec{\theta}) \rightarrow S_k(x; \vec{\theta})$. In some embodiments, the ordered sequence, expressed in Equation (6) can be the source seed or seed components.

$$S(x) = \{S_0(x; \vec{\theta}_0), \ldots, S_N(x; \vec{\theta}_N)\} \qquad \text{Equation (6)}$$

Figure 2:
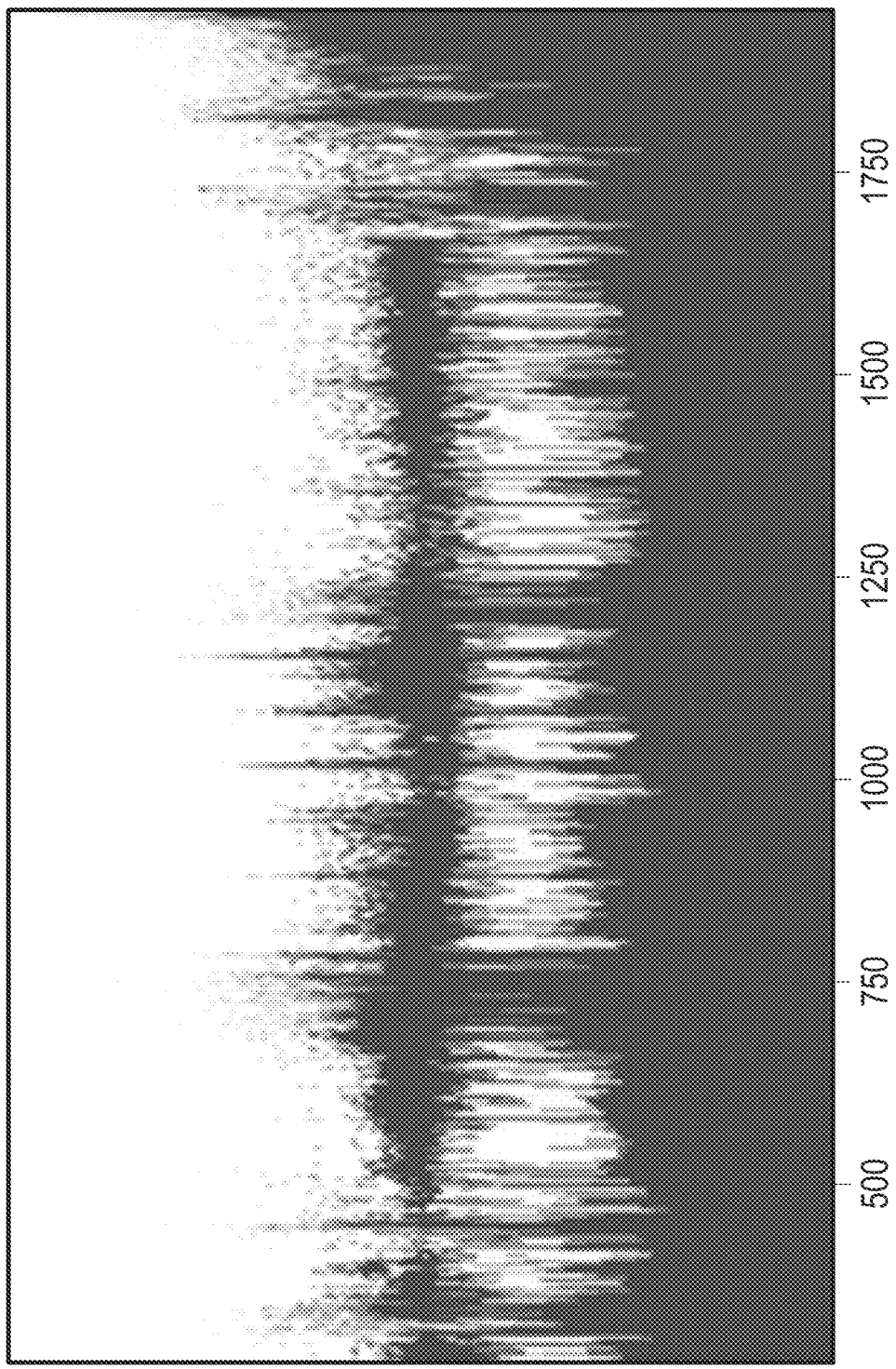
FIG. 2 illustrates a graph of a seed-component example for a targeted electric motor uptime source.

Each component can be a two-dimensional histogram, as shown in FIG. 2. {k} spans the domain of frequencies and $S_k(x; \vec{\theta})$, the respective codomain of the feature X. The collection of the components that are used to simulate a sample constitute a Seed. The number of components can depend on the measurable-dimension (axis) and features that define the sample. The features can be connected to the ones defined in a sample class or in a class feature space. For example, if temperature sample are being synthesized, where only one dimension of which is deemed relevant or useful, for example, the Ma feature, then only a single two-dimensional histogram is used to construct the seed. If instead, an acceleration (e.g., vibration sample) was being synthesized, with three dimensions and looking to span both time and frequency domains, at least six two-dimensional histograms, 3-axis (X, Y, Z) by 2-features, Real (Re) and Imaginary (Im) can be used. In this manner, the underlying histograms have the same meta-structure, where the independent variable (domain) in the X axis is the frequency-sequence, and the dependent variable (codomain) is in the Y axis, binning, for the specific frequency of the feature-values.

FIG. 2 illustrates a graph of a seed-component example for a targeted electric motor uptime source. Frequencies (in Hz) span the X axis with a range from 0 Hz to 2048 Hz and a resolution of 1 Hz determine the set of modes considered {k}. On the Y axis is displayed the domain of the feature Ma histogram, or a distribution of each frequency. Each frequency bin k is associated with a one-dimensional distribution of Re[S(x)] (and another for Im[S(x)] if needed). Stacking these across all k bins produces a two-dimensional histogram over (k, feature-value), representing the source component.

Figure 3:
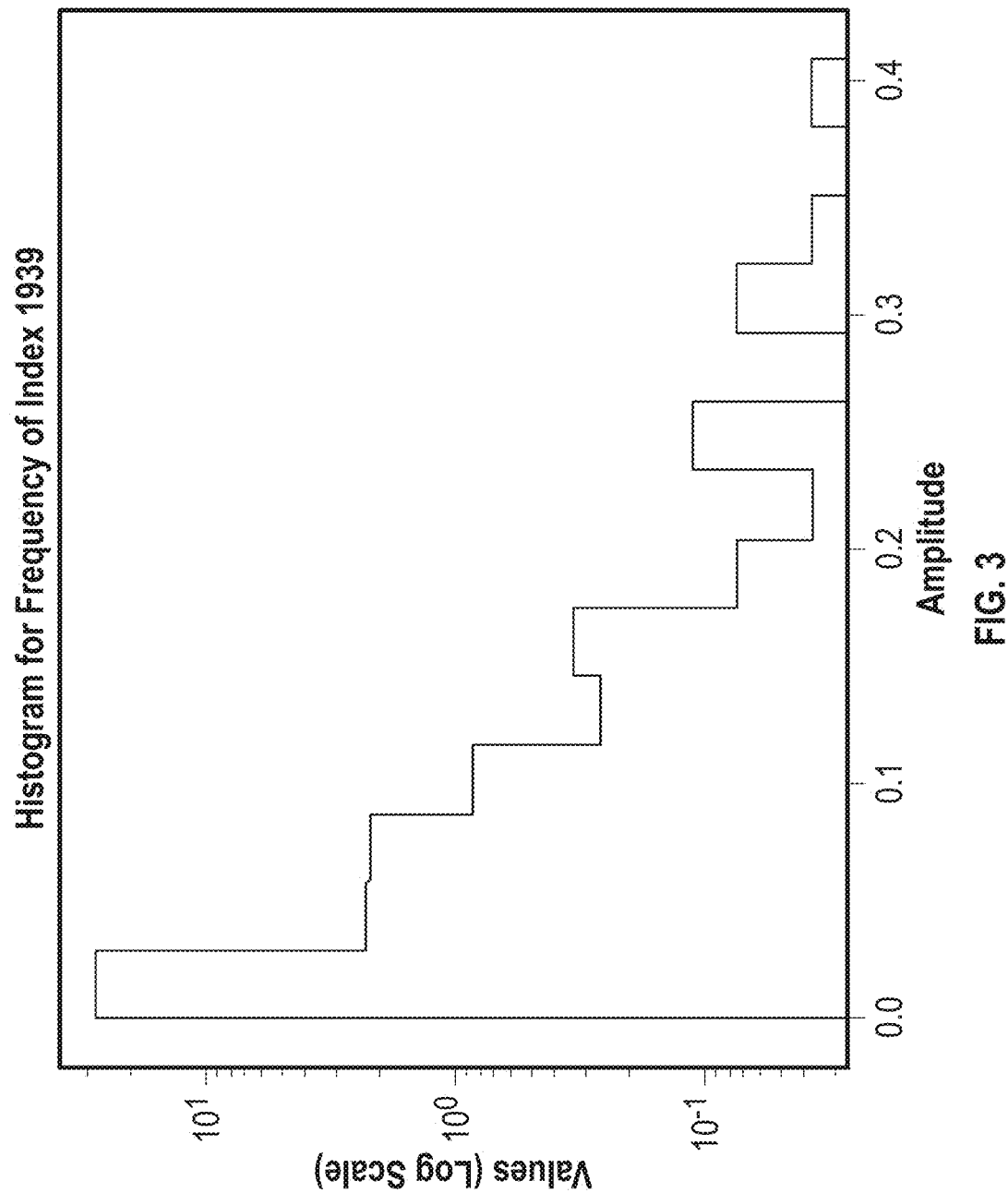
FIG. 3 illustrates a graph of a feature distribution (histogram) in log scale for an example frequency.

FIG. 3 illustrates a graph of the feature Ma distribution (histogram) in log scale for example frequency 1939 Hz from the seed example of FIG. 2. The graph highlights the bias and skewness nature of the feature towards zero. The intensity of the darker regions of the cell represents the codomain value of the feature Ma histogram.

Figure 4:
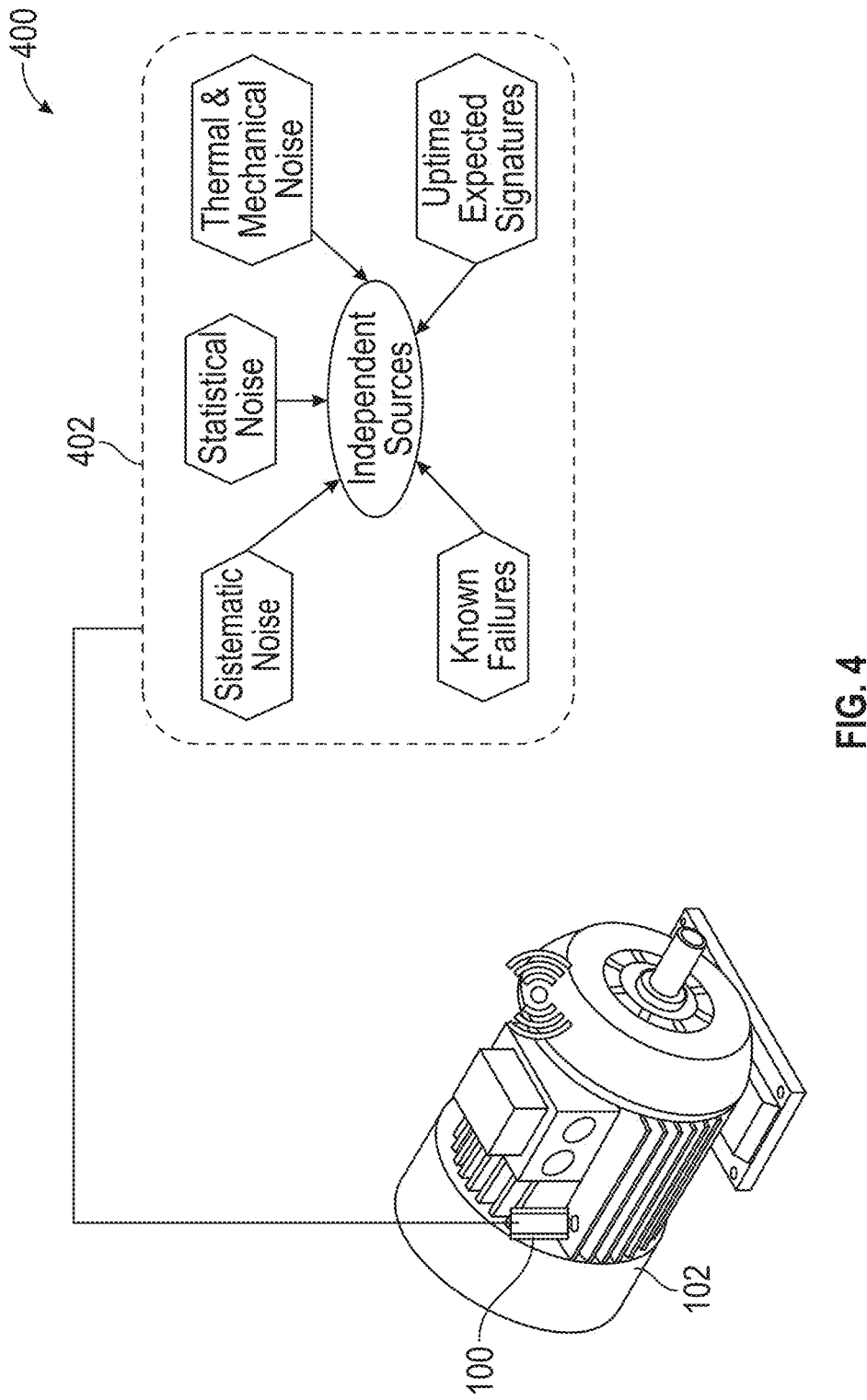
FIG. 4 illustrates an environment of an asset or machine 102, where a monitor can be deployed, or for which environment synthetic samples can be generated, according to some embodiments.

FIG. 4 illustrates an environment 400 of an asset or machine 102, where a monitor 100 can be deployed, to measure various operational or environmental parameters, such as machine vibrations, temperature and others. Synthetic samples can be generated to simulate or generate synthetic samples, which a monitor 100, attached to the machine 102 would have likely measured in the environment 400. Various phenomena occurs from one or more event inceptions and reach the monitor 100. Various independent sources 402 combine together to cause the monitor 100 to measure a signal. Each independent source 402 can be modeled and selectively combined to generate synthetic samples that the monitor 100 would have likely recorded had it been in the selected conditions. Example independent sources 402 include seismic noise, statistical noise, thermal and mechanical phenomena, the machine's regular, healthy or normal operating signatures, and the known failures. As part of building the data models for each independent source, data can be collected in that particular category with the environmental characteristics of that category. Furthermore, during synthesis a collection of samples can be generated, by varying contributions from each category or independent source 402, in order to simulate a real world scenario that the machine 102 might experience. An example scenario can include the machine 102 operating in healthy conditions for a first period of time and developing a known failure for a second period of time, causing a thermal event in a third period of time, where a synthetic sample generator (SSG) can synthesize samples for each period, and combine them to build or model that scenario.

Synthetic Sample Generator (SSG)

The synthetic sample generation can be performed in two stages, seed research and development cycle, and synthetic data generation. The seed research and development cycle includes researching and generating a statistical representation $S_k(x; \vec{\theta})$ of what an independent and isolated source of perturbation events can resemble. In some embodiments, the statistical representation used is a two-dimensional histogram of the Fourier Transform of a collection of selected samples of a source. In other words, the statistical representation, in some embodiments, can be a distribution extension to the Fourier Transform for a set of samples. The data synthesis stage can be implemented by control, execution modules and other components, where synthetic samples are generated from a source seed, developed in the first stage.

The goal of the seed-development cycle is to estimate and optimize the seed for any source of interest. In some embodiments, the cycle can happen in an offline environment, where topic experts can craft a dataset, representative of a target source, from which a statistical representation $S_k(x; \vec{\theta})$ can be extracted.

Figure 5:
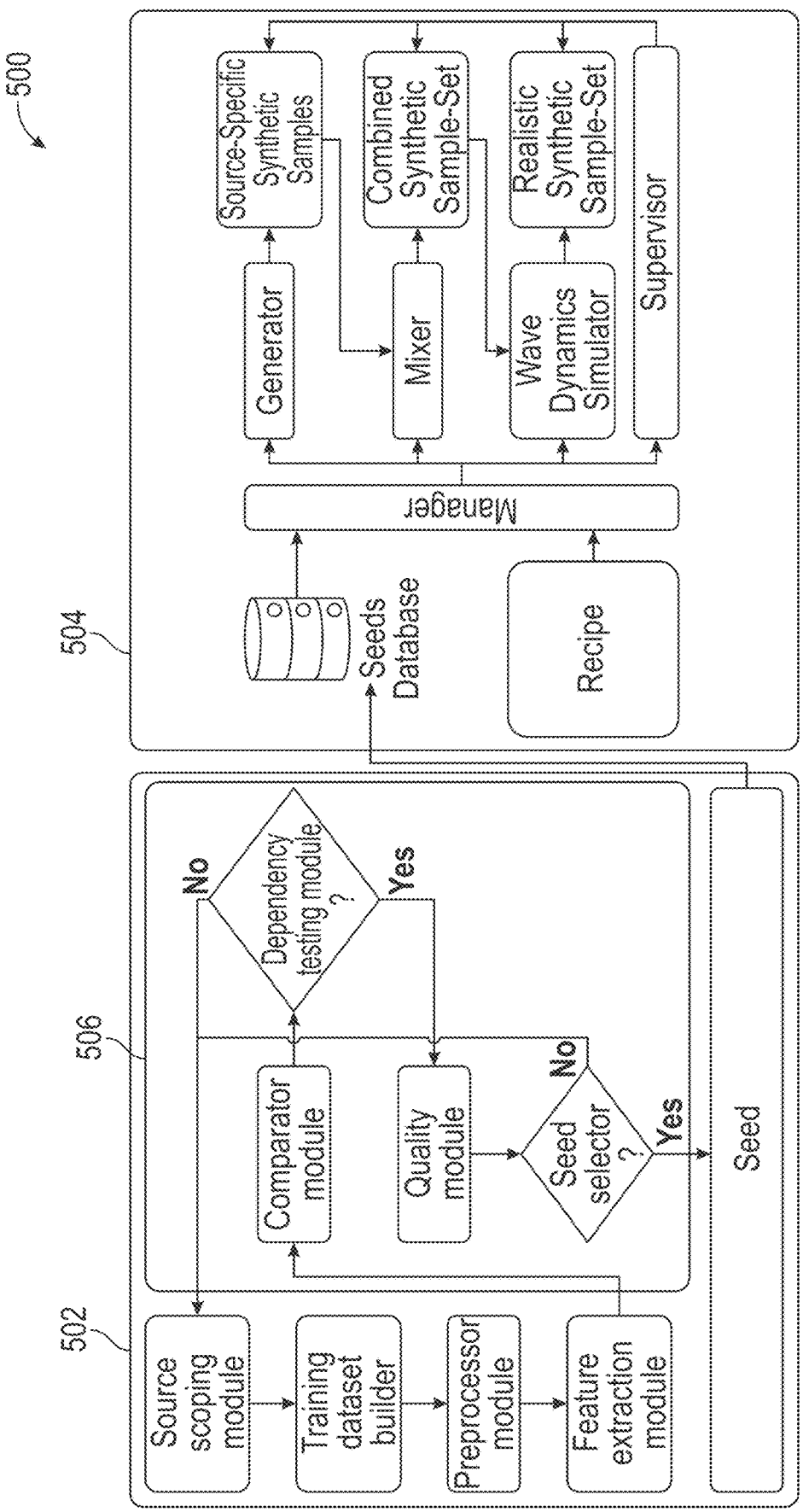
FIG. 5 illustrates a block diagram of a synthetic sample generator (SSG), according to an embodiment.

FIG. 5 illustrates a block diagram of a synthetic sample generator (SSG) 500, according to an embodiment. The SSG 500 includes a seed development cycle stage (SDCS) 502 and a synthesis execution stage (SES) 504.

Framework

Each sensor (monitor 100) event can be discrete wave signal, as expressed in Equation (7).

$$x[n], \text{ where } n=0,1,\ldots,N-1 \qquad \text{Equation (7)}$$

N is the number of samples in time. To obtain its frequency-domain representation, a DFT of signal x[n] can be obtained, as expressed in Equation (8).

$$X[k] = \sum_{n=0}^{N-1} x[n]e^{-i2\pi kn/N}, k = 0, 1, \ldots, N-1. \qquad \text{Equation (8)}$$

Here, x[n] is real (the measured signal), while each Fourier component X[k] is complex.

Fourier Components as Random Variables

The deterministic DFT can be extended, by modeling each Fourier coefficient X[k] as a random variable, according to Equation (9).

$$X[k] \sim D_k(\theta_k) \qquad \text{Equation (9)}$$

Here $D_k(\theta_k)$ is a probability distribution, parameterized by frequency-dependent parameters $\theta_k$. The spectrum can be treated as a set of draws from these distributions, then inverted via the inverse DFT, according to Equation (10).

$$x[n] = \frac{1}{N}\sum_{k=0}^{N-1} X[k]e^{i2\pi kn/N} \qquad \text{Equation (10)}$$

Synthetic signals can be generated by sampling each X[k] from $D_k(\theta_k)$. This approach allows flexible, data-driven simulation when the distributions at each frequency bin are estimated. This approach is more robust to the extent that Fourier components at different frequencies are independent. Although, the Fourier components are not always independent, in case where this approximation is true, the complexity of the calculations can be reduced. At the same time, minor correlations (e.g., small frequency misalignments in real data) can usually be negligible if the chosen frequency resolution sufficiently captures key features.

Building Source Seed and Associated Components

The process of researching and building the Seeds can include selecting a dataset representative of the source, cleaning the representative dataset (e.g., from noise or other artifacts), computing for each sample component (X, Y, Z) a per-frequency distribution from the Fourier amplitudes of their samples, reviewing the seed using a quality criteria to assess the level of source independence and the synthesis output quality. The seeds can be uploaded to a database for the synthetic sample generation stage.

The SDCS 502 can include a source scoping module, which is responsible for providing selection criteria and context for a training dataset, corresponding to a phenomenon or operating condition for which synthetic samples are to be generated.

The SDCS 502 can include a training dataset builder, which can collect real samples under the conditions specified by the source scoping module. The training dataset can be used for histogram-based estimation of $D_k(\theta_k)$.

The SDCS 502 can include a preprocessor module, which can perform clean up, normalization, filtering and fixing, depending on the circumstances of the training dataset. For example, the preprocessor module can fix frequency resolution and range for a synthetic or virtual monitor to match the real-world conditions of a real monitor 100, in the same scenario or environment. The preprocessor module can normalize or scale signals to separate overall energy levels from structural patterns. For example, the signals from a machine 102, operating under loaded conditions, can be different than signals, from the same machine 102, operating unloaded.

The SDCS 502 can include a feature extraction module, which can compute the DFT for each sample in the training dataset, extract real and imaginary parts (or magnitude-phase) at each frequency bin, and Build histograms or parametric fits that form the probability distribution $D_k(\theta_k)$.

The SDCS 502 can include a validation module 506, which is responsible for performing validation, which can include assessing the seed's fidelity by comparing synthetic outputs and real data statistically (e.g., by mutual information, or distribution similarity). The validation module 506 can include a comparator module, which can compute and compare mutual information between collection of seeds, and a realistic training dataset. The comparator module can also use other techniques for determining whether the seed is sufficiently similar to a realistic training dataset, for example by assessing a statistical similarity, a distribution similarity, KL divergence, earth mover's distance, or other techniques. A dependency testing module can test whether the seeds are independent or interrelated. If the seeds are not independent, the source scoping module operations can be reperformed. If the seeds are independent, they progress to a quality module, which computes quality metrics that can arise from the seeds. A seed selector module can determine whether the seeds quality metrics are within an acceptable threshold. If yes, the seeds are stored as the output of the SDCS 502. If not, the dependency testing module and source scoping module operations can be reperformed.

The SDCS 502 can perform storage and deployment, by storing the preprocessed seed in a database for the synthesis execution stage (SES) 504.

Synthesis Execution Stage (SES) and Execution Modules Therein

In some embodiments, the SES 504 can include three execution modules, the generator, the mixer and the wave dynamics simulator. The generator takes in a single seed and synthesizes from it a selected number of synthetic samples.

The generator can create single-source samples, for example, downtime samples from a pump or normal operating samples of a motor. The mixer handles combining samples from different sources. The mixer takes the output of the generator and processes it to create a selected scenario, for example, an uptime pump with a final stage cavitation failure. This can be achieved by inner manipulation of samples, intra-manipulation of the samples, and by proportionally mixing the samples, relative to the selected scenario. In other words, the mixer can combine outputs from multiple seeds to form a multi-phenomena signal (e.g., normal operation plus a bearing wear).

The wave dynamics simulator transforms the mixer output with physics dynamics. In other words, the wave dynamics simulator applies physics-based transformations to the output of the mixer. For example, the transformations applied by the wave dynamics simulator can account for the effect of having a failure far from the sensor, or an asset in a very hot environment, etc. The physics dynamics can depend on the source or sources from which, or for which, the synthetic samples are being generated. For example, pressure or external vibration from a selected distance to a monitor can travel to the sensor, based on the laws of physics applicable to propagation of pressure through a medium. In this example, the physics dynamics include pressure wave propagation through a medium, which the Wave Dynamics Simulator can use to modify the output of the mixer and generate the synthetic samples.

Control Module

In some embodiments, two control modules can be used. The supervisor, which tracks metrics along the synthesis process to return a quality report at the end. The supervisor monitors quality metrics (e.g., intermediate quality metrics, distribution alignment, amplitude statistics, etc.) to increase the fidelity of the generated samples. Manager can orchestrate the steps in which data flows, and what execution module runs, etc. Manager can coordinate data flow among module, execute or cause to execute an operational sequence, and can integrate the final outputs of the various modules in SES 504. In some embodiments, the manager can utilize a recipe, where for example, the recipe can outline a selected sample environment, scenario and sequence. For example, a recipe can outline a scenario, where an asset (e.g., a motor with bearings) runs for one year, with six months in normal, healthy operating conditions, but develops a bearing failure after six months of healthy and normal operations, followed by a rise in the operating temperature of the motor within the last two months of operation. The recipe can include the asset type, asset specification, selected failures, failure degrees, and monitor 100 configurations (e.g., what type of sampling is used, its frequency, duration, resolution and other sampling characteristics). In some embodiments, the manager selects the seeds, based on a recipe.

Alternative Embodiments

Bayesian Parameter Estimation for Fourier Coefficients

In addition, or in lieu of applying a histogram-based estimation, a Bayesian inference can be applied to obtain posterior distributions for each Fourier coefficient. If $Dk(\theta k)$ is a parametric family with a prior $p(\theta k)$, factorized likelihood functions across training set signals are given by Equation (11)

$$p(\{X[k]\}_{train} \mid \theta_k) = \prod_{j=1}^{M} p(X_j[k] \mid \theta_k),\qquad \text{Equation (11)}$$

where M is the number of training samples and Xj[k] is the k-th Fourier coefficient of the j-th training signal. Applying Bayes' theorem yields Equation (12)

$$p(\theta_k \mid \{X[k]\}_{train}) \propto p(\theta_k)\prod_{j=1}^{M} p(X_j[k] \mid \theta_k) \qquad \text{Equation (12)}$$

Point estimates, such as posterior means or maximum a posteriori estimates, can then be used for θk. This approach enables uncertainties in parameter estimates to be captured and propagated to the synthetic signals.

Optimal Frequency Bin Allocation

A factor in generating synthetic signals, using the described embodiments, is the selection of frequency bins within the range 0 ... fs/2, where fs is the sampling rate. Let B be the number of bins. For each bin, $$\Delta_f = \frac{f_s}{B} \qquad \text{Equation (13)}$$

An excessively large B can dilute signal energy among too many bins, yielding sparse estimates in each bin, while a small B can oversimplify the signal. A balanced bin allocation satisfies Equation (14)

$$SNR(k) \approx \frac{\|X[k]\|^2}{\sigma_k^2} \qquad \text{Equation (14)}$$

where $\sigma_k^2$ is the variance in the coefficient domain. Choosing B so that SNR(k) is sufficiently large in each bin improves estimation reliability.

Time-Domain Correlation and Covariance Control

Although each coefficient is modeled independently, certain real-world processes can produce short-range correlations in time. Let Rx(τ) be the autocorrelation function of the real sensor signal, $$R_x(T) = \mathbb{E}[x[n]x[n+T]] \qquad \text{Equation (15)}$$

Upon generating synthetic signals, their empirical autocorrelation can be monitored for alignment with the selected Rx(τ). Approximations due to the independence assumption can be mitigated by introducing small covariance terms between adjacent Fourier bins. Defining a banded covariance matrix of size B×B, where only a limited neighborhood of off-diagonal entries is nonzero, effectively preserving short-range dependence, without substantial computational overhead.

Non-Stationarity and Time-Varying Spectra

Some sensor signals can exhibit nonstationary behavior, where frequency content evolves over time. To address this, an extended model partitions each synthetic signal into segments of length L. Let a be the overlap factor controlling how many samples are reused for smooth transitions between segments. For each segment, the generating process updates the Equation (16)

$$x_{seg}[n] = \frac{1}{L}\sum_{k=0}^{N-1} X_{seg}[k]e^{i2\pi kn/L} \qquad \text{Equation (16)}$$

with segment-dependent distributions Xseg[k]. Parameter interpolation can be employed across segments to increase continuity.

Constrained Generation for Physical Consistency

When modeling physical phenomena, constraints can be introduced after inverse DFT to shape the signal. For example, ensuring positivity for phenomena that cannot be negative or enforcing envelopes for amplitude-bounded systems. A function φ(x) can be defined that enforces a constraint x∈Ω. An iterative projection step can be used, according to Equation (17)

$$x^{(m+1)} = \phi\{F^{-1}[F[x^{(m)}]]\} \qquad \text{Equation (17)}$$

where F denotes the DFT and $F^{-1}$ the inverse DFT. This can increase the likelihood that each constraint is satisfied without significantly distorting the spectrum.

Stochastic Process Theory Integration

The synthetic generation process can also be framed within the context of stationary and ergodic processes. If the real signals are approximately stationary and ergodic, the time average approximates the ensemble average. In that case, the training dataset reliably represents the underlying distribution for each coefficient. Modeling X[k] with Dk(θk) can preserve the mean power spectral density of the real-world source. This additional foundation can extend the robustness of the seed-based generation architecture and can broaden its applicability to diverse sensor types and operating regimes.

By treating each Fourier component as a random variable drawn from a frequency-specific distribution, high-fidelity signals can be produced. This can enable efficient development, testing of edge cases, and robust evaluation of sensor-based anomaly detection algorithms. The described approaches can balance practical constraints with rigor, ensuring realistic data that can meet the statistical and phenomenological constrains.

Figure 6:
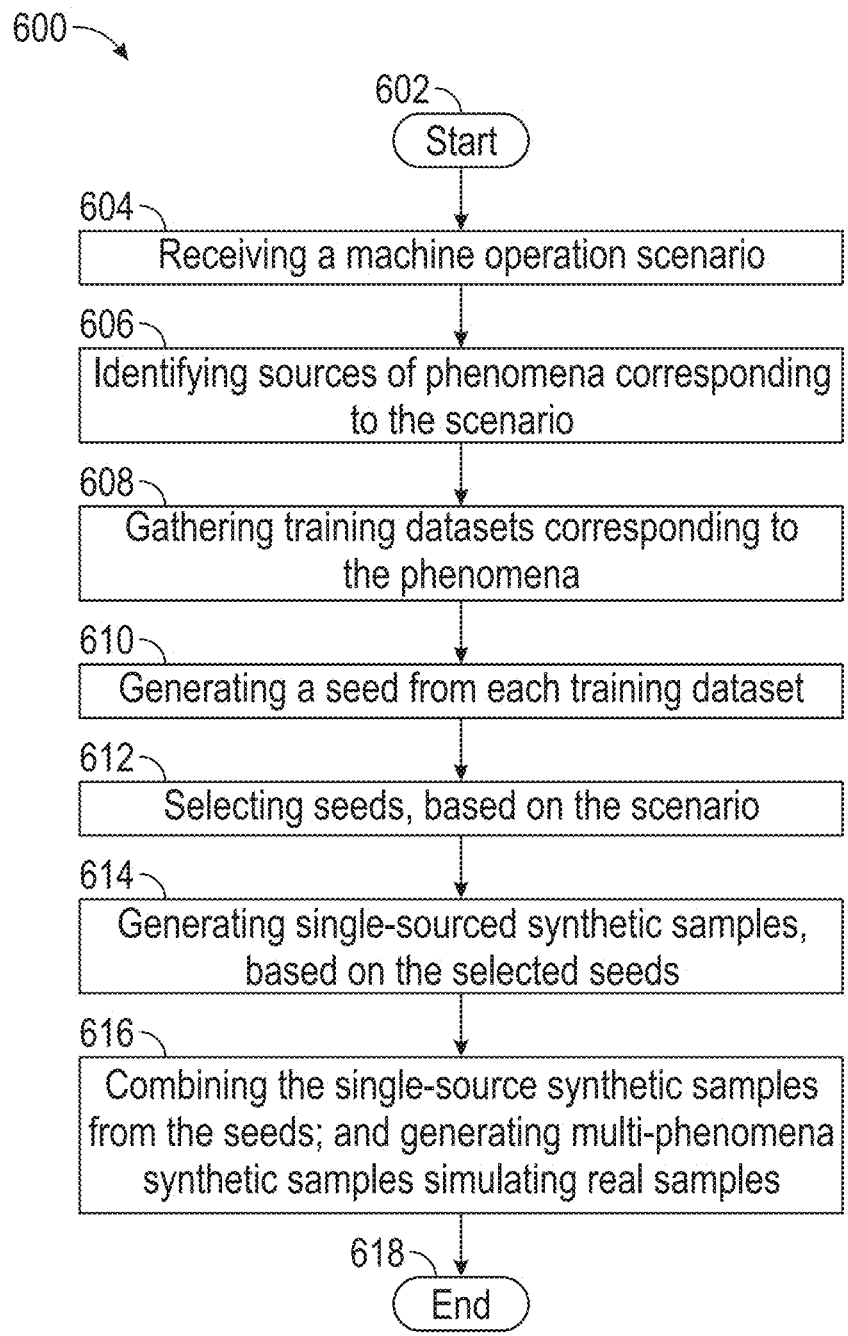
FIG. 6 illustrates a flowchart of an example method of generating synthetic samples according to an embodiment.

FIG. 6 illustrates a flowchart of an example method 600 of generating synthetic samples according to an embodiment. The method starts at step 602. Step 604 includes receiving a machine operations scenario, for which synthetic samples are to be generated. Example scenario are outlined above in relation to the feature of recipes, described in relation to the embodiment of FIG. 5. Step 606 includes identifying sources of phenomena, corresponding to the scenario. For example, sources, such as electrical, mechanical, thermal or otherwise can be identified. Step 608 includes gathering and labeling training datasets that correspond to the identified sources and the phenomena. This can include gathering real samples from monitors 100 that have been previously deployed in the same or similar circumstances, corresponding to the scenario.

Step 610 includes generating a seed from each training dataset. Generating the seed can include obtaining the DFT of the samples, and replacing and/or modeling the Fourier coefficients with random variables obtained from a distribution of the samples. Example distributions can include a probability distribution, parameterized by frequency-dependent parameters Ok, as described above. Step 612 includes selecting seeds based on the scenario. For example, healthy, normal operation seeds and one or more failures can be selected, based on the scenario.

Step 614 includes generating singles-source synthetic samples, based on the selected seeds. Each single-source synthetic samples collection corresponds to, and is generated from, a selected seed. Generating single-source synthetic samples can include using the spectrum generated for a seed as a set of draws from the distributions and inverting with an inverse DFT. Synthetic samples arise by sampling each X[k] from $D_k(\theta_k)$. In other words, generating the single-source synthetic samples can include obtaining the DFT of the samples in a training dataset, where the DFT has Fourier coefficients, and modeling or replacing each Fourier coefficient as a random variable, where the random variable is a frequency-dependent distribution of samples in a training dataset. Generating the single-source synthetic samples further includes sampling the distributions and obtaining inverse DFT of the sampled distributions.

Step 616 includes combining the single-source synthetic samples from the seeds, and generating multi-phenomena synthetic samples, simulating real samples that a monitor 100 would have likely generated had it been placed to collect samples from the machine in the scenario received at step 604. The multi-phenomena synthetic samples can be used for a variety of applications, including for example to test, evaluate and/or otherwise develop one or more failure analysis models. The method ends at step 618.

Example steps for synthetic data generation for vibration-based machine failure identification can include the following.

Step 1: Data Acquisition and Statistical Characterization

Data acquisition and statistical characterization can include machine and failure scope definition. Machine and failure scope definition can include identifying the machine type (e.g., induction motor, gearbox, centrifugal pump, compressor, chillers, etc.), defining failure modes associated with machine type, such as bearing defects, imbalance, misalignment, looseness, gear faults, cavitation, or others. The scope definition and data collection can include both healthy and failing conditions for meaningful comparisons.

The data acquisition and statistical characterization can include vibration data collection. For example, using accelerometers with a high sampling rate (e.g., 10-50 kHz) to capture machine vibrations, and maintaining a consistent sampling rate for frequency-domain integrity, and collecting data under varying loads, speeds, and failure severities.

The data acquisition and statistical characterization can include obtaining a frequency-domain representation (DFT). A time-domain signal xj[n] is converted into frequency domain, Xj[k], using DFT. Each Fourier coefficient Xj[k] contains information about spectral energy distribution, which can correspond to detecting failure-specific features.

Step 2: Probabilistic Modeling of Frequency Components

Probabilistic Modeling of frequency components can include modeling frequency coefficients as random variables. Each frequency component X[k] can be modeled as a stochastic variable, $D_k(\theta k)$. In other words, $X[k] \sim D_k(\theta_k)$, where $D_k(\theta_k)$ represents the estimated probability distribution for the spectral coefficient at frequency bin k.

Probabilistic modeling of frequency components can include estimating probability distributions. Distributions can be estimated from a training dataset using various techniques, including for example, by using a histogram-based, non-parametric estimation, or by using a parametric modeling approach (e.g., Gaussian, Laplacian), or by using a Bayesian inference for uncertainty quantification.

Probabilistic modeling of frequency components can include failure-specific spectrum characterization. Different failure types can exhibit distinct spectral features. A failure type can be mapped to a corresponding probability distribution. For example, for bearing faults, concentration of spectral energy can be at fault frequencies. Strong second and third harmonics can correspond to misalignment failure. Sideband structures due to modulated vibration can correspond to gear faults. Broadband noise with no distinct frequency components can correspond to cavitation. A probabilistic failure dictionary can be constructed to map frequency characteristics to specific machine faults. The failure dictionaries can be updated as new failures are processed and cataloged.

Step 3: Synthetic Failure Signal Generation

Synthetic failure signal generation can include sampling synthetic Fourier coefficients. New frequency-domain representations can be generated by drawing samples from the estimated distributions ($X^*[k] \sim D_k(\theta_k)$). Each coefficient can be synthesized, while preserving statistical properties of a corresponding real failure signal.

Synthetic failure signal generation can include generating a synthetic vibration signal using inverse discrete Fourier transform (IDFT). The IDFT can be performed, using the synthesized coefficients, producing a time-domain waveform that simulates real machine failure patterns and features.

In some embodiments, synthetic signal generation can include applying physical constraints or generating the synthetic signals within a selected constrain parameters. In some embodiments, to more closely match a real signal, one or more constraints can be applied. For example, one constraint includes preserving the total energy of the synthesized signal, relative to a corresponding real signal. The total spectral energy of the synthesized signal can be matched with total spectral energy of a corresponding real signal, to match their spectral energy. Another constraint can include applying phase continuity, which can reduce or minimize unnatural discontinuities in the synthetic signals. Another constraint can include applying selected frequency constraints to reduce or minimize over-amplification of harmonics.

Step 4: Validation and Deployment

Validation and deployment can include performing statistical similarity tests, between the synthetic signals and their corresponding real signals. Some validation techniques or metrics, which can be used, can include performing power spectral density (PSD) alignment, performing Kullback-Leibler (KL) divergence between real and synthetic distributions, and performing mutual information analysis to measure dependencies in spectral features.

Validation and deployment can include failure mode verification. Failure mode verification can increase the likelihood that synthetic signals can exhibit expected or selected spectral characteristics. some examples of failure mode verification can include: testing that bearing defects appear as peaks at characteristic fault frequencies; testing that misalignment signals contain dominant harmonic structures; and testing that cavitation signals exhibit broadband spectral noise.

Deployment

Example uses of synthetic data can include training machine learning models for predictive maintenance, testing anomaly detection algorithms on rare failure cases, and simulating real-world conditions in digital twin environments.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 7:
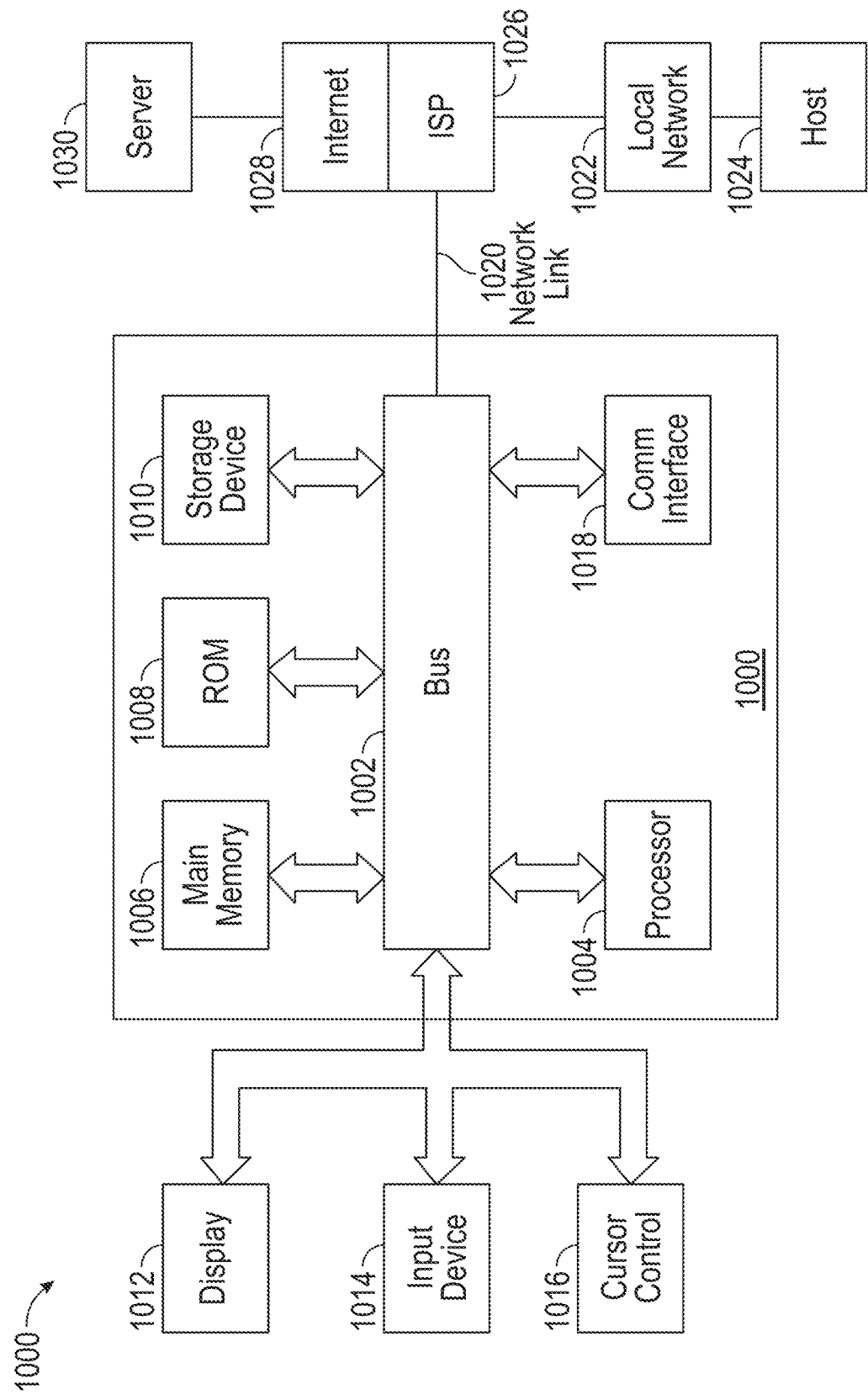
FIG. 7 illustrates an environment in which some embodiments may operate.

For example, FIG. 7 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

Examples

It will be appreciated that the present disclosure may include any one and up to all of the following examples.

Example 1: A method comprising: receiving a scenario of machine operations, the machine operations impacted by a plurality of phenomena; determining sources of the phenomena; gathering training datasets of samples of the machine operations, corresponding to the phenomena; generating a seed from each training datasets, the seed comprising a statistical representation of an independent and isolated source of a phenomena; selecting seeds, based on the scenario; generating single-sourced synthetic samples from a selected seed; and combining the single-sourced synthetic samples, generating multi-phenomena synthetic samples simulating real samples from the machine operations, as impacted by the plurality of the phenomena.

Example 2: The method of Example 1, further comprising: testing a failure prediction model with the multi-phenomena synthetic samples.

Example 3: The method of any of Examples 1 and 2, further comprising: combining the singles-sourced synthetic samples, based on physics dynamics corresponding to each synthetic sample's source.

Example 4: The method of any of Examples 1-3, wherein combining the single-sourced synthetic samples are in proportions, based on the scenario.

Example 5: The method of any of Examples 1-4, further comprising: obtaining a distribution for each training dataset; and based on the distribution and the samples in the training dataset, generating synthetic samples.

Example 6: The method of any of Examples 1-5, further comprising: obtaining a discrete Fourier transform (DFT) of samples in the training dataset, the DFT comprising Fourier coefficients; modeling each Fourier coefficient as a random variable, wherein the random variable is a frequency-dependent distribution of samples in a training dataset; sampling the modeled Fourier coefficients; and performing inverse discrete Fourier transform with the sampled modeled Fourier coefficients.

Example 7: The method of any of Examples 1-6, further comprising combining the single-sourced synthetic samples, based in part on configuration of a real monitor device.

Example 8: A non-transitory computer-storage medium that stores executable program instructions that, when executed by one or more computing devices, configure the one or more computing devices to perform operations comprising: receiving a scenario of machine operations, the machine operations impacted by a plurality of phenomena; determining sources of the phenomena; gathering training datasets of samples of the machine operations, corresponding to the phenomena; generating a seed from each training datasets, the seed comprising a statistical representation of an independent and isolated source of a phenomena; selecting seeds, based on the scenario; generating single-sourced synthetic samples from a selected seed; and combining the single-sourced synthetic samples, generating multi-phenomena synthetic samples simulating real samples from the machine operations, as impacted by the plurality of the phenomena.

Example 9: The non-transitory computer storage of Example 8, wherein the operations further comprise: testing a failure prediction model with the multi-phenomena synthetic samples.

Example 10: The non-transitory computer storage of any of Examples 8 and 9, wherein the operations further comprise: combining the singles-sourced synthetic samples, based on physics dynamics corresponding to each synthetic sample's source.

Example 11: The non-transitory computer storage of any of Examples 8-10, wherein combining the single-sourced synthetic samples are in proportions, based on the scenario.

Example 12: The non-transitory computer storage of any of Examples 8-11, wherein the operations further comprise: obtaining a distribution for each training dataset; and based on the distribution and the samples in the training dataset, generating synthetic samples.

Example 13: The non-transitory computer storage of any of Examples 8-12, wherein the operations further comprise: obtaining a discrete Fourier transform (DFT) of samples in the training dataset, the DFT comprising Fourier coefficients; modeling each Fourier coefficient as a random variable, wherein the random variable is a frequency-dependent distribution of samples in a training dataset; sampling the modeled Fourier coefficients; and performing inverse discrete Fourier transform with the sampled modeled Fourier coefficients.

Example 14: The non-transitory computer storage of any of Examples 8-13, wherein the operations further comprise: combining the single-sourced synthetic samples, based in part on configuration of a real monitor device.

Example 15: A system comprising one or more processors, wherein the one or more processors are configured to perform operations comprising: receiving a scenario of machine operations, the machine operations impacted by a plurality of phenomena; determining sources of the phenomena; gathering training datasets of samples of the machine operations, corresponding to the phenomena; generating a seed from each training datasets, the seed comprising a statistical representation of an independent and isolated source of a phenomena; selecting seeds, based on the scenario; generating single-sourced synthetic samples from a selected seed; and combining the single-sourced synthetic samples, generating multi-phenomena synthetic samples simulating real samples from the machine operations, as impacted by the plurality of the phenomena.

Example 16: The system of Example 15, wherein the operations further comprise: testing a failure prediction model with the multi-phenomena synthetic samples.

Example 17: The system of any of Examples 15 and 16, wherein the operations further comprise: combining the singles-sourced synthetic samples, based on physics dynamics corresponding to each synthetic sample's source.

Example 18: The system of any of Examples 15-17, wherein combining the single-sourced synthetic samples are in proportions, based on the scenario.

Example 19: The system of any of Examples 15-18, wherein the operations further comprise: obtaining a distribution for each training dataset; and based on the distribution and the samples in the training dataset, generating synthetic samples.

Example 20: The system of any of Examples 15-19, wherein the operations further comprise: obtaining a discrete Fourier transform (DFT) of samples in the training dataset, the DFT comprising Fourier coefficients; modeling each Fourier coefficient as a random variable, wherein the random variable is a frequency-dependent distribution of samples in a training dataset; sampling the modeled Fourier coefficients; and performing inverse discrete Fourier transform with the sampled modeled Fourier coefficients.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed is:

1. A method comprising:
receiving a scenario of machine operations, the machine operations impacted by a plurality of phenomena;

determining sources of the phenomena;
gathering training datasets of samples of the machine operations, corresponding to the phenomena;
generating a seed from each training datasets, the seed comprising a statistical representation of an independent and isolated source of a phenomena;
selecting seeds, based on the scenario;
generating single-sourced synthetic samples from a selected seed, and applying one or more physical constraints when generating the single-source synthetic samples to preserve a total energy of the generated single-source synthetic samples relative to a corresponding real signal;
combining the single-sourced synthetic samples, generating multi-phenomena synthetic samples simulating real samples from the machine operations, as impacted by the plurality of the phenomena;
training a failure prediction model with the multi-phenomena synthetic samples;
generating vibration data by an accelerometer of the sensor attached to a machine;
applying the generated vibration data to the trained failure prediction model; and
determining the occurrence of an operational anomaly of the machine by the trained failure prediction model based on the applied vibration data.

2. The method of claim 1, further comprising:
attaching the sensor to the machine, wherein the sensor comprises:
a housing;
a housing lid;
wireless communication circuitry;
the accelerometer, wherein the accelerometer is configured to measure and transmit both magnitude and spectral data of vibrations of the machine;
a battery; and
a microcontroller configured to reduce battery consumption by controlling the operation of the sensor from a hibernation mode that reduces power to components of the sensor to a normal operation mode in which the sensor obtains the vibration data by the accelerometer;
wherein the housing lid encloses the housing and seals the wireless communication circuitry, the accelerometer, the microcontroller and the battery; and
obtaining the vibration data by the sensor on a scheduled sampling interval.

3. The method of claim 2, further comprising:
receiving by the sensor, operational parameters of timing and frequency of when and how the sensor should collect data from the machine; and
obtaining the vibration data according to the received operational parameters.

4. The method of claim 1, further comprising:
applying a physical constraint of phase continuity when generating the single-source synthetic samples to reduce or minimize unnatural discontinuities in the generated single-source synthetic samples.

5. The method of claim 1, further comprising:
applying frequency constraints to reduce or minimize over-amplification of harmonics in the generated single-source synthetic samples.

6. The method of claim 1, wherein a total spectral energy of the generated single-source synthetic sample is matched with a total spectral energy of a corresponding real signal.

7. The method of claim 1, further comprising:
obtaining a discrete Fourier transform (DFT) of samples in the training dataset, the DFT comprising Fourier coefficients;
modeling each Fourier coefficient as a random variable, wherein the random variable is a frequency-dependent distribution of samples in a training dataset;
sampling the modeled Fourier coefficients; and
performing inverse discrete Fourier transform with the sampled modeled Fourier coefficients.

8. A non-transitory computer-storage medium that stores executable program instructions that, when executed by one or more computing devices, configure the one or more computing devices to perform operations comprising:
receiving a scenario of machine operations, the machine operations impacted by a plurality of phenomena;
determining sources of the phenomena;
gathering training datasets of samples of the machine operations, corresponding to the phenomena;
generating a seed from each training datasets, the seed comprising a statistical representation of an independent and isolated source of a phenomena;
selecting seeds, based on the scenario;
generating single-sourced synthetic samples from a selected seed, and applying one or more physical constraints when generating the single-source synthetic samples to preserve a total energy of the generated single-source synthetic samples relative to a corresponding real signal; and
combining the single-sourced synthetic samples, generating multi-phenomena synthetic samples simulating real samples from the machine operations, as impacted by the plurality of the phenomena;
training a failure prediction model with the multi-phenomena synthetic samples;
generating by a sensor attached to a machine, vibration data by an accelerometer of the sensor;
applying the generated vibration data to the trained failure prediction model; and
determining the occurrence of an operational anomaly of the machine by the trained failure prediction model based on the applied vibration data.

9. The non-transitory computer storage of claim 8, wherein the operations further comprise:
applying a physical constraint of phase continuity when generating the single-source synthetic samples to reduce or minimize unnatural discontinuities in the generated single-source synthetic samples.

10. The non-transitory computer storage of claim 8, wherein the operations further comprise:
applying frequency constraints to reduce or minimize over-amplification of harmonics in the generated single-source synthetic samples.

11. The non-transitory computer storage of claim 8, wherein a total spectral energy of the generated single-source synthetic sample is matched with a total spectral energy of a corresponding real signal.

12. The non-transitory computer storage of claim 8, wherein the operations further comprise:
obtaining a distribution for each training dataset; and
based on the distribution and the samples in the training dataset, generating synthetic samples.

13. The non-transitory computer storage of claim 8, wherein the operations further comprise:
obtaining a discrete Fourier transform (DFT) of samples in the training dataset, the DFT comprising Fourier coefficients;

modeling each Fourier coefficient as a random variable, wherein the random variable is a frequency-dependent distribution of samples in a training dataset;
sampling the modeled Fourier coefficients; and
performing inverse discrete Fourier transform with the sampled modeled Fourier coefficients.

14. A system comprising one or more processors, wherein the one or more processors are configured to perform operations comprising:
receiving a scenario of machine operations, the machine operations impacted by a plurality of phenomena;
determining sources of the phenomena;
gathering training datasets of samples of the machine operations, corresponding to the phenomena;
generating a seed from each training datasets, the seed comprising a statistical representation of an independent and isolated source of a phenomena;
selecting seeds, based on the scenario;
generating single-sourced synthetic samples from a selected seed, and applying one or more physical constraints when generating the single-source synthetic samples to preserve a total energy of the generated single-source synthetic samples relative to a corresponding real signal; and
combining the single-sourced synthetic samples, generating multi-phenomena synthetic samples simulating real samples from the machine operations, as impacted by the plurality of the phenomena;
training a failure prediction model with the multi-phenomena synthetic samples;
generating vibration data by an accelerometer;
applying the generated vibration data to the trained failure prediction model; and
determining the occurrence of an operational anomaly of the machine by the trained failure prediction model based on the applied vibration data.

15. The system of claim 14, wherein the operations further comprise:
applying a physical constraint of phase continuity when generating the single-source synthetic samples to reduce or minimize unnatural discontinuities in the generated single-source synthetic samples.

16. The system of claim 14, wherein the operations further comprise:
applying frequency constraints to reduce or minimize over-amplification of harmonics in the generated single-source synthetic samples.

17. The system of claim 14, further comprising:
a sensor comprising:
a housing;
a housing lid;
wireless communication circuitry;
the accelerometer, wherein the accelerometer is configured to measure and transmit both magnitude and spectral data of vibrations of the machine;
a battery; and
a microcontroller configured to reduce battery consumption by controlling the operation of the sensor from a hibernation mode that reduces power to components of the sensor to a normal operation mode in which the sensor obtains the vibration data by the accelerometer;
wherein the housing lid encloses the housing and seals the wireless communication circuitry, the accelerometer, the microcontroller and the battery.

18. The system of claim 14, wherein the operations further comprise:
obtaining a distribution for each training dataset; and
based on the distribution and the samples in the training dataset, generating synthetic samples.

19. A method comprising:
receiving a scenario of machine operations, the machine operations impacted by a plurality of phenomena;
determining sources of the phenomena;
gathering training datasets of samples of the machine operations, corresponding to the phenomena;
generating a seed from each training datasets, the seed comprising a statistical representation of an independent and isolated source of a phenomena;
selecting seeds, based on the scenario;
generating single-sourced synthetic samples from a selected seed;
combining the single-sourced synthetic samples, generating multi-phenomena synthetic samples simulating real samples from the machine operations, as impacted by the plurality of the phenomena;
training a failure prediction model with the multi-phenomena synthetic samples;
attaching a sensor to a machine, wherein the sensor comprises:
a housing;
a housing lid;
wireless communication circuitry;
an accelerometer, wherein the accelerometer is configured to measure and transmit both magnitude and spectral data of vibrations of the machine;
a battery; and
a microcontroller configured to reduce battery consumption by controlling the operation of the sensor from a hibernation mode that reduces power to components of the sensor to a normal operation mode in which the sensor obtains vibration data by the accelerometer;
wherein the housing lid encloses the housing and seals the wireless communication circuitry, the accelerometer, the microcontroller and the battery;
receiving by the sensor, operational parameters of timing and frequency of when and how the sensor should collect data from the machine;
obtaining the vibration data, via the accelerometer, according to the received operational parameters;
applying the vibration data to the trained failure prediction model; and
determining the occurrence of an operational anomaly of the machine by the trained failure prediction model based on the applied vibration data.

20. The method of claim 19, further comprising:
applying one or more physical constraints when generating the single-source synthetic samples to:
preserve a total energy of the generated single-source synthetic samples relative to a corresponding real signal;
to reduce or minimize unnatural discontinuities in the generated single-source synthetic samples; or
to reduce or minimize over-amplification of harmonics in the generated single-source synthetic samples.

* * * * *